(12) United States Patent
Hong

(10) Patent No.: US 7,675,598 B2
(45) Date of Patent: Mar. 9, 2010

(54) IMAGE DISPLAY DEVICE HAVING WIDE AND NARROW VIEWING ANGLE MODES AND METHOD OF DRIVING THE SAME

(75) Inventor: Hyung-Ki Hong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 528 days.

(21) Appl. No.: 11/644,871

(22) Filed: Dec. 26, 2006

(65) Prior Publication Data

US 2007/0296900 A1 Dec. 27, 2007

(30) Foreign Application Priority Data

Jun. 27, 2006 (KR) ............... 10-2006-0057987
Dec. 18, 2006 (KR) ............... 10-2006-0129262

(51) Int. Cl.
*G02F 1/1343* (2006.01)
(52) U.S. Cl. .............. 349/141; 349/110; 349/123; 349/124; 349/125; 349/126; 349/127; 349/128; 349/129; 349/130
(58) Field of Classification Search .............. 349/114, 349/110, 129
See application file for complete search history.

(56) References Cited

U.S. PATENT DOCUMENTS

| 7,068,336 | B2 * | 6/2006 | Oh et al. ............... 349/123 |
| 7,379,137 | B2 * | 5/2008 | Kubo ............... 349/114 |
| 7,391,489 | B2 * | 6/2008 | Kume et al. ............... 349/129 |
| 2005/0052605 | A1 * | 3/2005 | Okumura ............... 349/146 |

FOREIGN PATENT DOCUMENTS

KR 10-2000-0066806 11/2000

* cited by examiner

*Primary Examiner*—David Nelms
*Assistant Examiner*—Thanh-Nhan P Nguyen
(74) *Attorney, Agent, or Firm*—Holland & Knight LLP

(57) ABSTRACT

An image display device includes a display panel, and a barrier including a plurality of transmissive portions and a plurality of blocking portions on the display panel, wherein the plurality of transmissive portions and the plurality of blocking portions are arranged in a matrix, wherein $3N^{th}$ rows and $(3N-1)^{th}$ rows include the plurality of transmissive portions and the plurality of blocking portions, N being a positive integer, $(3N-2)^{th}$ rows include the plurality of transmissive portions excluding the plurality of blocking portions, , and the transmissive and blocking portions are alternately arranged.

26 Claims, 11 Drawing Sheets

IMAGE DISPLAY DEVICE HAVING WIDE AND NARROW VIEWING ANGLE MODES AND METHOD OF DRIVING THE SAME

The invention claims the benefit of Korean Patent Application Nos. 2006-0057987 and 2006-129262, filed in Korea on Jun. 27, 2006 and Dec. 18, 2006, which are hereby incorporated by reference in its entirety.

BACKGROUND OF THE INVENTION

1. Field of the Invention

Embodiments of the invention relate to a display device, and more particularly, to a display device and a method of driving the same having wide and narrow viewing modes. Although embodiments of the invention are suitable for a wide scope of applications, they are particularly suitable for providing a display device and a method of driving the same that provide convertibility between wide and narrow viewing angle modes.

2. Discussion of the Related Art

In general, a liquid crystal display ("LCD") device, which functions as an image display device, includes a first substrate, a second substrate, and a liquid crystal layer. The first and second substrates face each other with a space therebetween, and the liquid crystal layer is interposed between the first and second substrates. An LCD device uses optical anisotropy and polarization properties of liquid crystal molecules to display images. The LCD device includes at least one polarizer on the first and second substrates. Light vibrating a predetermined direction can only pass the polarizer such that the polarizer produces a polarized light.

Viewing angle is an important factor for an LCD device. Thus, the LCD device having a wide viewing angle has been suggested. For example, a twisted nematic ("TN") liquid crystal cell and a compensation film are used for the LCD device to obtain a wide viewing angle.

FIG. 1 is an exploded perspective view of a wide viewing angle LCD device including a TN liquid crystal cell and a uniaxial retardation film according to the related art. In FIG. 1, a wide viewing angle LCD device 10 includes a TN liquid crystal cell 15, two uniaxial retardation films 13, a first polarizer 11 and a second polarizer 17. The two uniaxial retardation films 13 are disposed on the TN liquid crystal cell 15. The first polarizer 11 is disposed on the uniaxial retardation films 13, and the second polarizer 17 is disposed under the TN liquid crystal cell 15. Thus, the two uniaxial retardation films 13 and the TN liquid crystal cell 15 are disposed between the first and second polarizers 11 and 17.

Such an LCD device having a TN liquid crystal cell has a narrow viewing angle, and luminance of such an LCD device depends on viewing positions of a user. This problem is resulted from refractive index anisotropy of liquid crystal molecules in the TN liquid crystal cell, although the viewing angle is compensated to some extent by disposing the two uniaxial retardation films 13 between the first polarizer 11 and the TN liquid crystal cell 15.

Polarized light, which is perpendicularly incident into the uniaxial retardation film, is not changed by the uniaxial retardation film. However, polarized light, which is obliquely incident into the uniaxial retardation film, is changed by the uniaxial retardation film. Thus, when the polarized light is perpendicularly incident into the two uniaxial retardation films 13, polarizing state of the perpendicularly incident light is not changed by the two uniaxial retardation films 13. In addition, when the polarized light is obliquely incident into the two uniaxial retardation films 13, there is a change in polarizing state due to the two uniaxial retardation films 13. The narrow viewing angle of the LCD device having the TN liquid crystal cell 15 is improved to some extent by controlling a double refraction index of the two uniaxial retardation films 13. Accordingly, the LCD device 10 in FIG. 1 has an improved viewing angle; however, such an LCD device does not provide multi-viewing modes and does not have convertibility between wide and narrow viewing modes.

FIG. 2 is an exploded perspective view of an LCD device having convertibility between wide and narrow viewing angle modes according to the related art. In FIG. 2, an LCD device 50 having the convertibility between the wide and narrow viewing angle modes includes a wide viewing angle mode liquid crystal cell 55, an auxiliary parallel alignment cell 53, and first and second polarizers 51 and 57. The first and second polarizers 51 and 57 are disposed on outer surfaces of the wide viewing angle mode liquid crystal cell 55 and the auxiliary parallel alignment cell 53, respectively.

An alignment direction of the auxiliary parallel alignment cell 53 is parallel to the optical axis of the first polarizer 51, and liquid crystal molecules in the auxiliary parallel alignment cell 53 are aligned parallel to each other, not has a twisted shape. The LCD device 50 including the auxiliary parallel alignment cell 53 produces images that have a clear color change, not color deterioration. In addition, the LCD device 50 including the auxiliary parallel alignment cell 53 has the narrow viewing angle on left and right sides and upper and lower sides.

Accordingly, the LCD device 50 including the auxiliary parallel alignment cell 53 can be convertible between the wide and narrow viewing angle modes. When voltage is not applied into the auxiliary parallel alignment cell 53 or voltage below a threshold is applied into the auxiliary parallel alignment cell 53, the LCD device 50 is in a wide viewing angle mode. In addition, when voltage above the threshold is applied into the auxiliary parallel alignment cell 53, the LCD device 50 is in a narrow viewing angle mode.

In more detail, when voltage is not applied into the auxiliary parallel alignment cell 53 or voltage below a threshold is applied into the auxiliary parallel alignment cell 53, the alignment direction of the auxiliary parallel alignment cell 53 is the same as the optical axis of the first polarizer 51. Accordingly, light passing the wide viewing angle liquid cell 55 passes the first polarizer 51, and the LCD device 50 provides a wide viewing angle. However, when voltage above the threshold is applied into the auxiliary parallel alignment cell 53, the liquid crystal molecules in the auxiliary parallel alignment cell 53 is rearranged to be perpendicular such that the viewing angle on sides is deteriorated. Accordingly, the LCD device 50 provides a narrow viewing angle.

In any event, the above-mentioned cell does not perfectly prevent producing images on sides. It can change phases of light but cannot block light. Accordingly, images are displayed on sides of the LCD device, and person on sides still can observe the images. As such, the LCD devices according to the related art fail to provide sufficient privacy of a user, even in a narrow viewing angle mode.

SUMMARY OF THE INVENTION

Accordingly, embodiments of the invention is directed to an image display and a method of driving the same that substantially obviate one or more of the problems due to limitations and disadvantages of the related art.

An object of embodiments of the invention is to provide an image display and a method of driving the same that provide convertibility between wide and narrow viewing angle modes.

Another object of embodiments of the invention is to provide an image display and a method of driving the same that have excellent lateral images blocking characteristic in the narrow viewing angle, to thereby enhance user privacy.

Another object of the present invention is to provide an image display device and a method of driving the same that reduce cross-talk defects and have an improved lateral images blocking characteristic.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, an image display device includes a display panel, and a barrier including a plurality of transmissive portions and a plurality of blocking portions on the display panel, wherein the plurality of transmissive portions and the plurality of blocking portions are arranged in a matrix, wherein $3N^{th}$ rows and $(3N-1)^{th}$ rows include the plurality of transmissive portions and the plurality of blocking portions, N being a positive integer, $(3N-2)^{th}$ rows include the plurality of transmissive portions excluding the plurality of blocking portions, , and the transmissive and blocking portions are alternately arranged.

In another aspect, an image display device includes a display panel, and a barrier including a first row, a second row and a third row, the first row being substantially transmissive, the second row having a plurality of first transmissive portions and first blocking portions, and the third row having a plurality of second transmissive portions and second blocking portions, the first transmissive portions and the first blocking portions respectively align with the second blocking portions and the second transmissive portions.

In another aspect, a method of driving an image display device including a plurality of image pixel units, which convertibly operates in wide and narrow viewing angle modes, each of a plurality of pixel units has first to sixth image pixels are arranged in a matrix of two columns and three rows, includes when operating in the narrow viewing angle mode, supplying first to sixth image signals into the first to sixth image signals, respectively, the third and sixth image signals different from the fourth and fifth image signals, and when operating in the wide viewing angle mode, supplying the third and sixth image signals same as the fourth and sixth image signals into the third and sixth image pixels.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention. In the drawings.

DETAILED DESCRIPTION OF THE PREFERRED EMBODIMENTS

Reference will now be made in detail to the preferred embodiments of the invention, examples of which are illustrated in the accompanying drawings.

Figure 1:
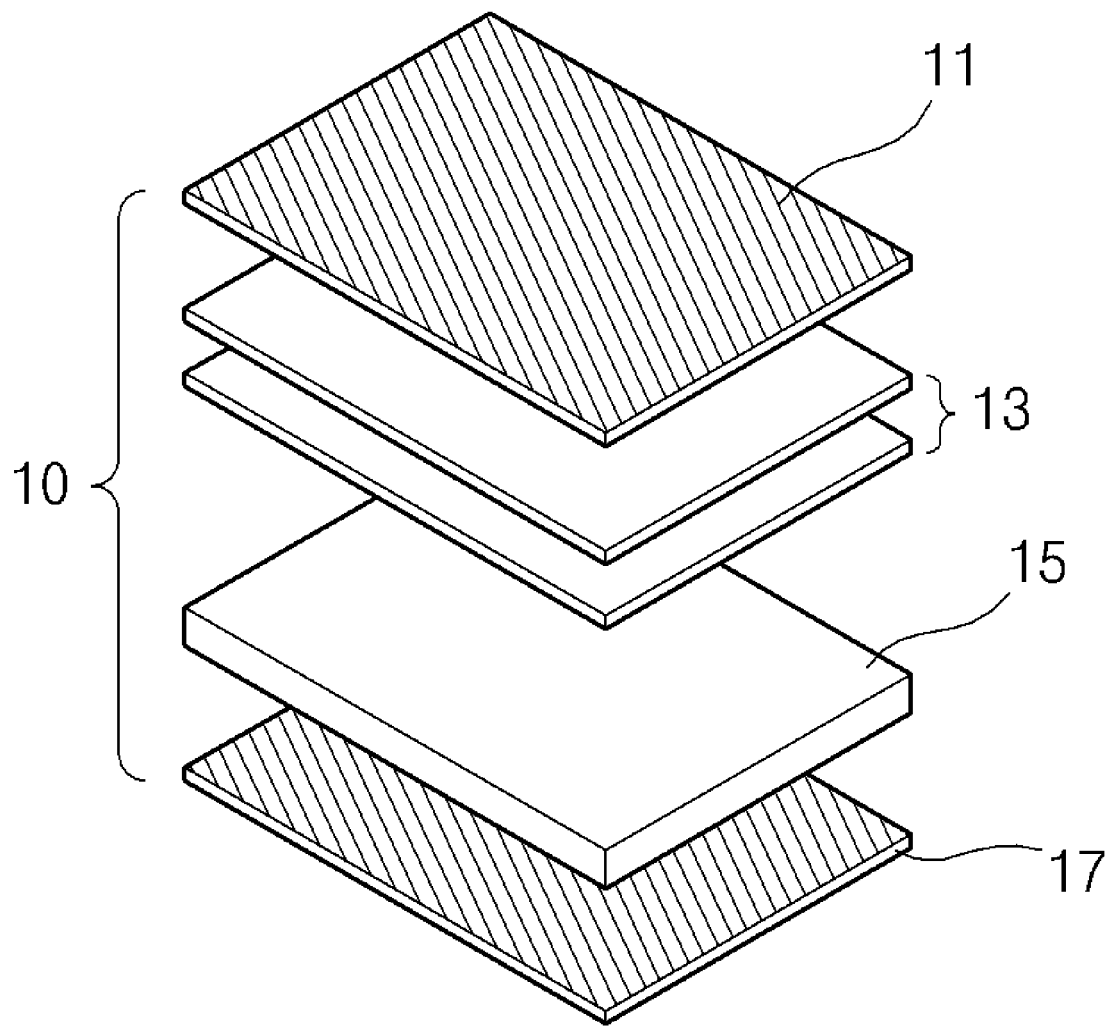
FIG. 1 is an exploded perspective view of a wide viewing angle LCD device including a TN liquid crystal cell and an uniaxial retardation film according to the related art.
Figure 2:
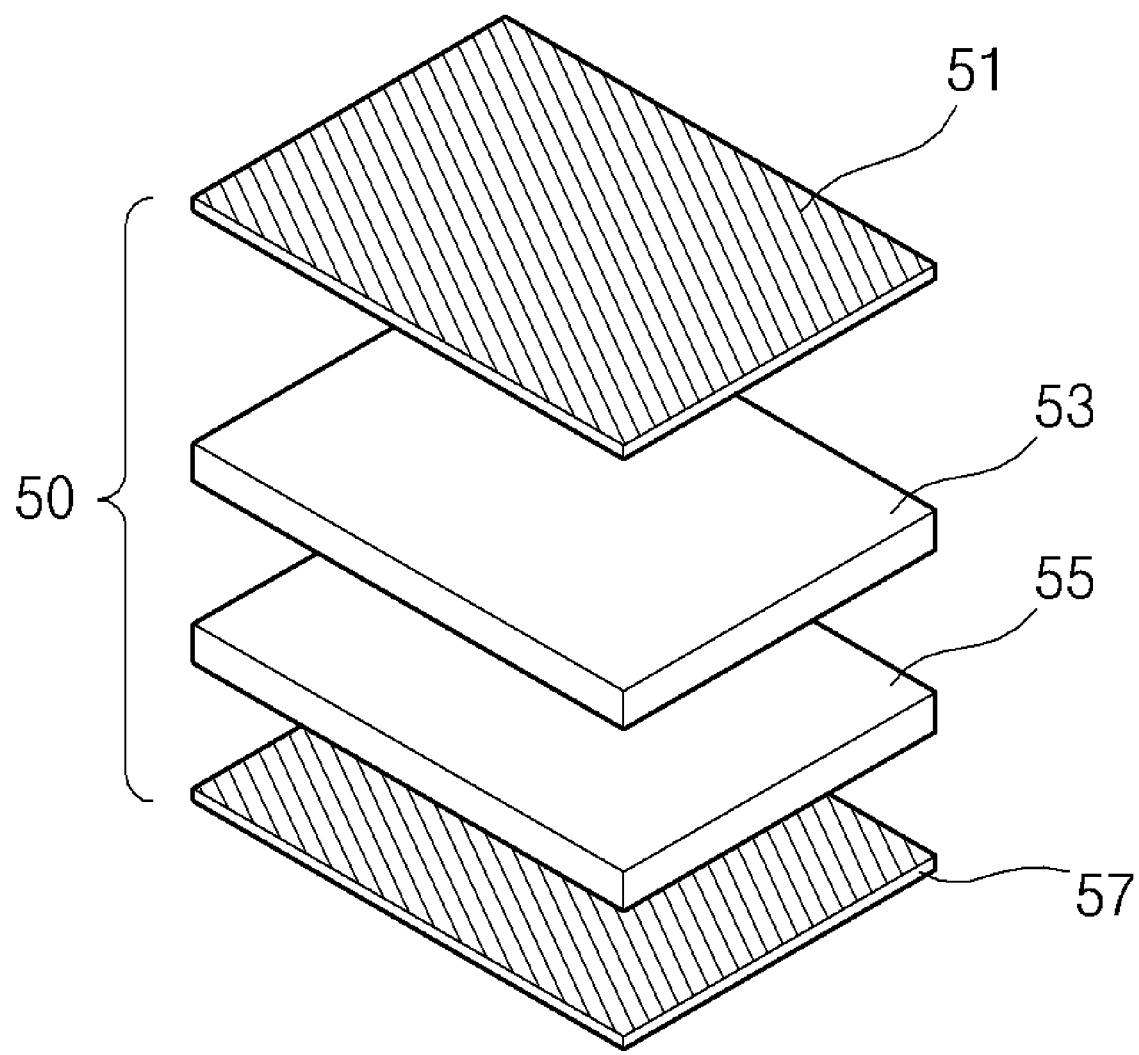
FIG. 2 is an exploded perspective view of an LCD device having convertibility between wide and narrow viewing angle modes according to the related art.
Figure 3:
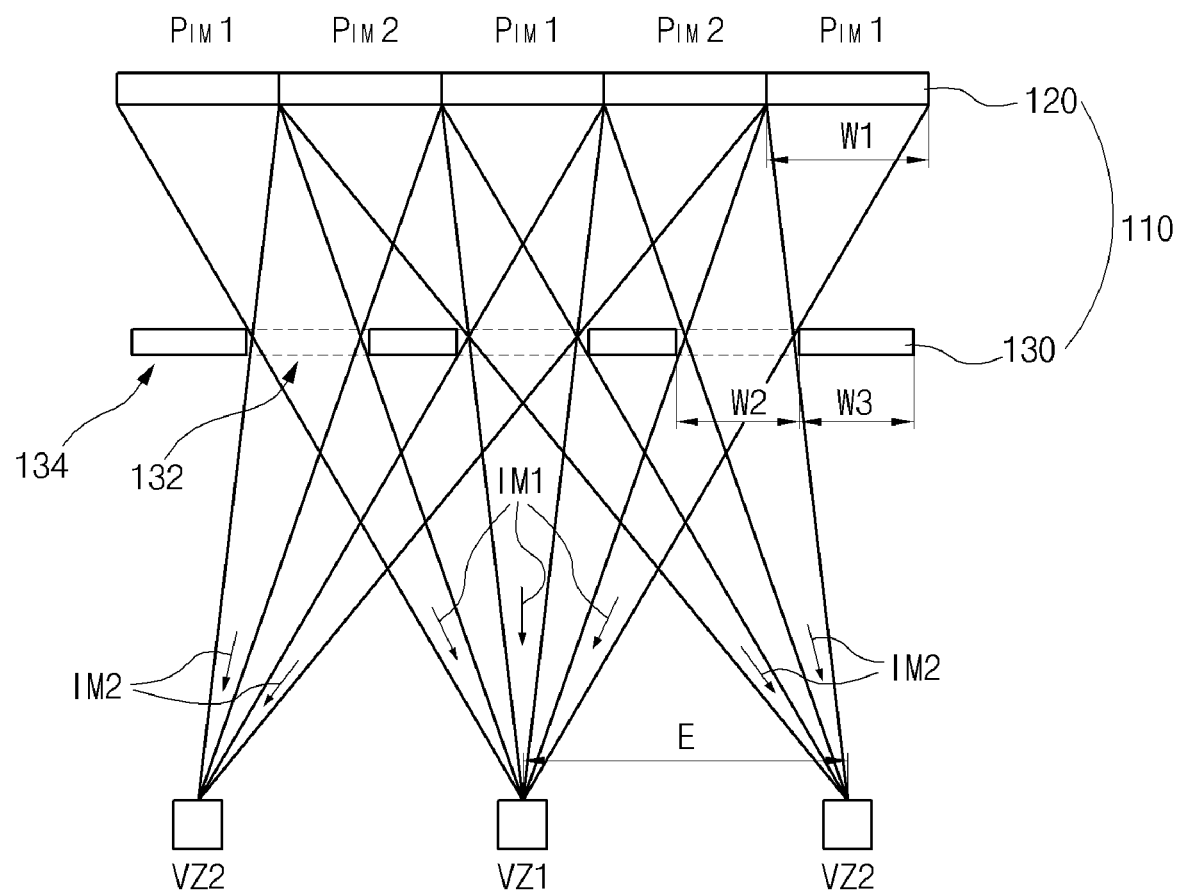
FIG. 3 is a cross-sectional view explaining how a viewing zone producing unit for an image display device according to an embodiment of the invention.

FIG. 3 is a cross-sectional view explaining how a viewing zone producing unit for an image display device according to an embodiment of the invention. In FIG. 3, an image display device 110 includes a display panel 120 and a barrier 130. The barrier 130 is disposed in the front of the display panel 120. The display panel 120 generates first and second images "IM1"and "IM2", and the barrier 130 functions as a viewing zone producing unit. First and second image pixels "$P_{IM1}$" and "$P_{IM2}$" are defined on the display panel 120. The first and second image pixels "$P_{IM1}$" and "$P_{IM2}$" may be alternately arranged on the display panel 120. The barrier 130 includes a transmissive portion 132 and a blocking portion 134 to selectively pass light from the first and second image pixels "$P_{IM1}$" and "$P_{IM2}$". All or a substantial amount of light passes through the transmissive portion 132, while all or a substantial amount of light is blocked by the blocking portion 134. The transmissive and blocking portion 132 and 134 may be alternately arranged.

Accordingly, the first image "IM1" from the first image pixels "$P_{IM1}$" generated by the display panel 120 passes the transmissive portion 132 of the barrier 130 to form a first viewing zone "VZ1". The second image "IM2" from the second image pixels "$P_{IM2}$" generated by the display panel 120 passes the transmissive portion 132 of the barrier 130 to form a second viewing zone "VZ2". For example, the first viewing zone "VZ1" is formed at a center portion of the display panel 120, and the second viewing zone "VZ2" is formed at two side portions of the first viewing zone "VZ1". Thus, users in the first and second viewing zones "VZ1" and "VZ2" receive different images.

The relationship between a first width "W1" between the first and second image pixels "$P_{IM1}$" and "$P_{IM2}$", a second width "W2" of the transmissive portion 132, a third width "W3" of the blocking portion 134, and a distance E between the first and second viewing zones "VZ1" and "VZ2" may be expressed by the following equation.

$$W2+W3=2/(1/E+1/W1)$$

By disposing the barrier 130 in the front of the display panel 120 and producing different images from the first and second image pixels "$P_{IM1}$" and "$P_{IM2}$", the image display device 110 respectively displays the first and second images "IM1" and "IM2" in the first and second viewing zones "VZ1" and "VZ2".

Figure 4A:
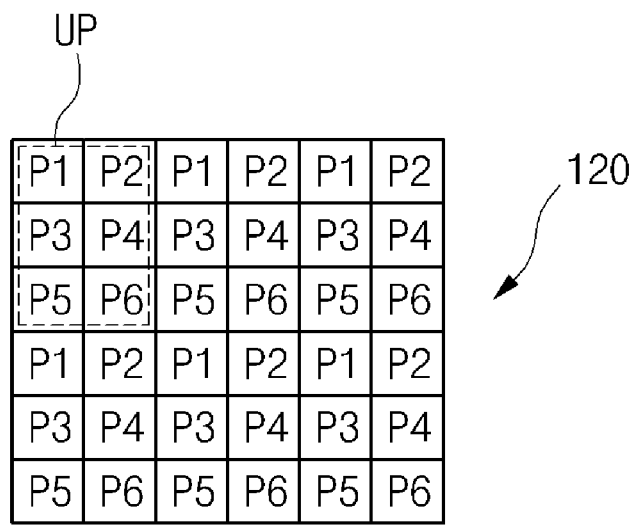
FIGS. 4A and 4B are plane views showing a portion of a display panel and a portion of a barrier for an image display device according to an embodiment of the invention, respectively.
Figure 4B:
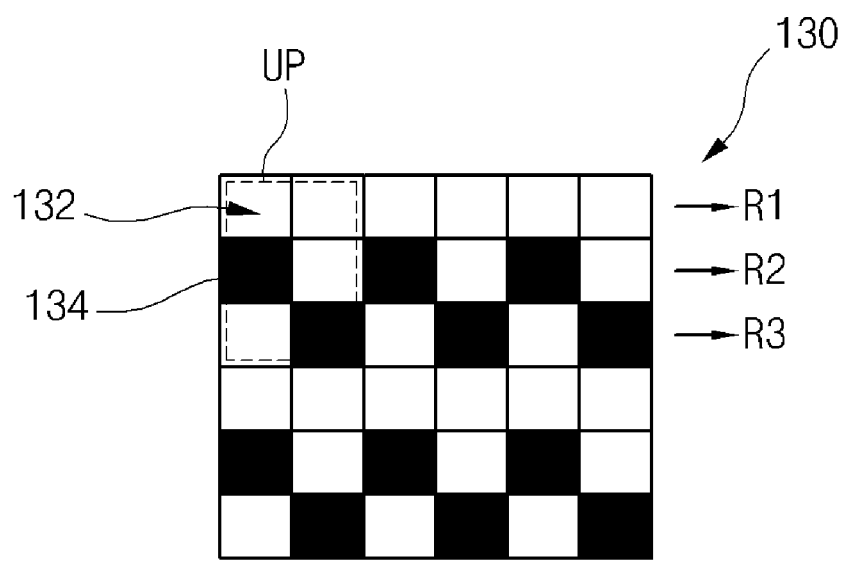

FIGS. 4A and 4B are plane views showing a portion of a display panel and a portion of a barrier for an image display device according to an embodiment of the invention, respectively. A horizontal direction in FIGS. 4A and 4B illustrates a horizontal direction of a image display device when users observe the image display device. As shown in FIG. 4A, the display panel 120 includes a plurality of image pixel units "UP". The plurality of image pixel units "UP" are arranged in a matrix shape. Each of the plurality of image pixel units "UP" includes first to sixth image sub-pixels "P1," "P2," "P3," "P4," "P5," and "P6." The first to sixth image sub-pixels "P1," "P2," "P3," "P4," "P5," and "P6" also are arranged in a matrix shape of 3 by 2. The first and second image sub-pixels "P1" and "P2" may be alternately arranged in (3N−2)th rows of the display panel 120, N being a positive integer. The third and fourth image sub-pixels "P3" and "P4" may be alternately arranged in (3N−1)th rows of the display panel 120. The fifth and sixth image sub-pixels "P5" and "P6" may be alternately arranged in (3N)th rows of the display panel 120. Each of the first to sixth image sub-pixels "P1," "P2," "P3," "P4," "P5," and "P6" may display different images from one another, or some of the first to sixth image sub-pixels "P1," "P2," "P3," "P4," "P5," and "P6" may display the same image. For example, four of the first to sixth image sub-pixels "P1," "P2," "P3," "P4," "P5," and "P6" may display the same image.

As shown in FIG. 4B, the barrier 130 includes a plurality of transmissive portions 132 and a plurality of blocking portions 134. The plurality of transmissive portions 132 and the plurality of blocking portions 134 are arranged in a matrix shape. The transmissive portions 132 may be disposed in (3N−2)th rows of the barrier 130, and the (3N−2)th rows of the barrier 130 may not have any blocking portions. In addition, the transmissive portions 132 and the blocking portions 134 may be alternately arranged in (3N−1)th and (3N)th rows of the barrier 130.

For example, the transmissive portions 132 excluding the blocking portions 134 are arranged in a first row "R1", and the transmissive and blocking portions 132 and 134 are alternately arranged in a second row "R2." The transmissive and blocking portions 132 and 134 are alternately arranged in a third row "R3." In addition, the transmissive portions 132 in the third row "R3" may correspond to the blocking portions 134 in the second row "R2," and the blocking portions 134 in the third row "R3" correspond to the transmissive portions 132 in the second row "R2." Other rows of the barrier 130 may have such a three-row arrangement.

Since the first and second image sub-pixels "P1" and "P2" correspond to the first row "R1," the images from the first and second image sub-pixels "P1" and "P2" displayed in the first and second viewing zones "VZ1" and "VZ2." Accordingly, the users always receive images from the first and second image sub-pixels "P1" and "P2." Since the third and fourth image sub-pixels "P3" and "P4" correspond to the second row "R2," the images from the third and fourth image sub-pixels "P3" and "P4" are displayed in one of the first and second viewing zones "VZ1" and "VZ2." For example, when the image from the third image sub-pixel "P3" is displayed in the first viewing zone "VZ1," the image from the fourth image sub-pixel "P4" is displayed in the second viewing zone "VZ2."

Similarly, since the fifth and sixth image sub-pixels "P5" and "P6" correspond to the third row "R3", the images from the fifth and sixth image sub-pixels "P5" and "P6" are displayed in one of the first and second viewing zones "VZ1" and "VZ2". For example, when the image from the fifth image sub-pixel "P5" is displayed in the first viewing zone "VZ1", the image from the sixth image sub-pixel "P6" is displayed in the second viewing zone "VZ2".

According to an embodiment of the invention, the third and fourth image sub-pixels "P3" and "P4" correspond to the blocking and transmissive portions 134 and 132, respectively, and the fifth and sixth image sub-pixels "P5" and "P6" correspond to the transmissive and blocking portions 132 and 134, respectively. Alternatively, the third and fourth image sub-pixels "P3" and "P4" may correspond to the transmissive and blocking portions 132 and 134, respectively, and the fifth and sixth image sub-pixels "P5" and "P6" may correspond to the blocking and transmissive portions 134 and 132, respectively.

Moreover, as mentioned above, the transmissive portions 132 in the third row "R3" correspond to the blocking portions 134 in the second row "R2", and the blocking portions 134 in the third row "R3" correspond to the transmissive portions 132 in the second row "R2." However, the transmissive portions 132 in the third row "R3" may correspond to the transmissive portions 132 in the second row "R2," and the blocking portions 134 in the third row "R3" may correspond to the blocking portions 134 in the second row "R2."

Figure 5A:
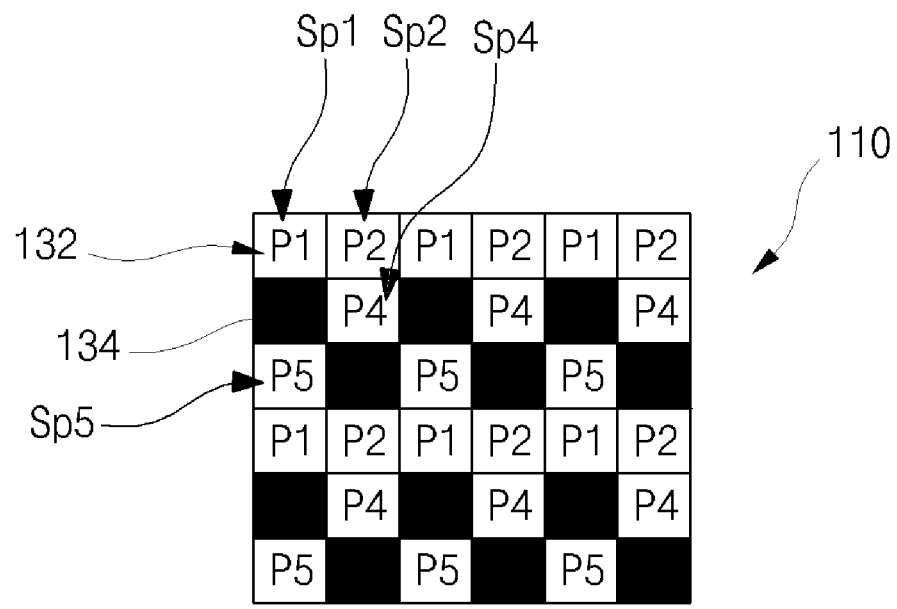
FIGS. 5A and 5B are plane views showing image pixels observed an imaged display device according to an embodiment of the invention at first and second viewing zones with a narrow viewing angle mode, respectively.
Figure 5B:
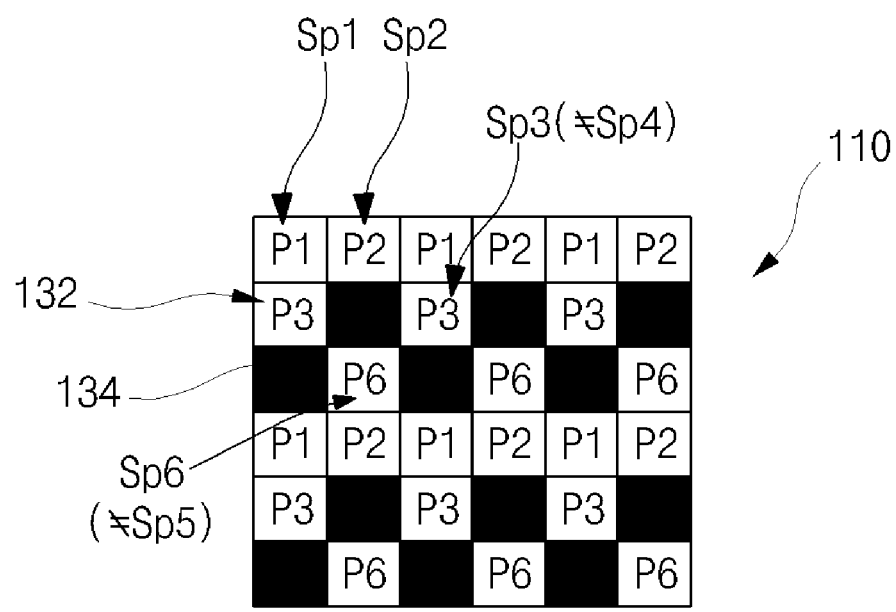
Figure 5C:
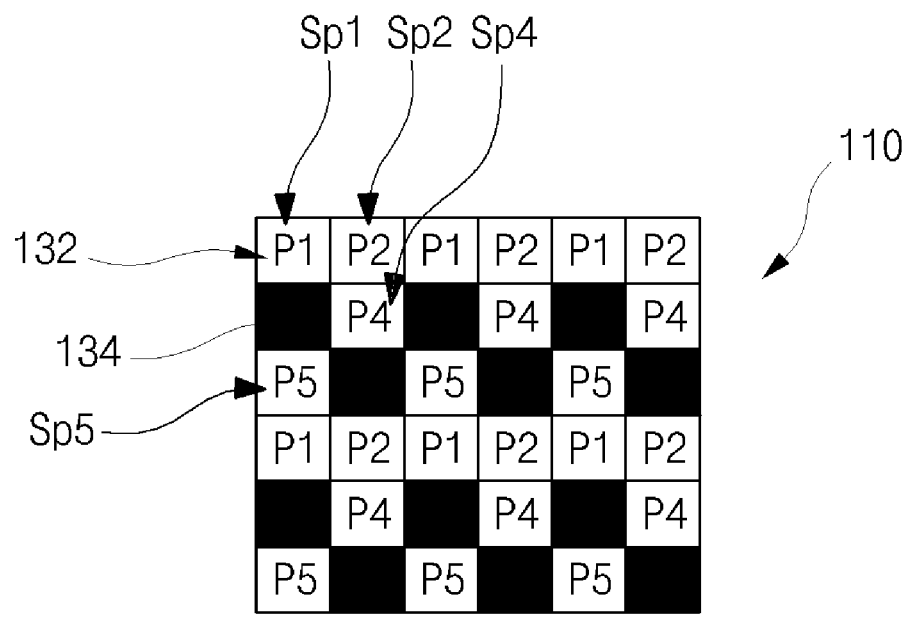
FIGS. 5C and 5D are plane views showing image pixels observed an imaged display device according to an embodiment of the invention at first and second viewing zones with a wide viewing angle mode, respectively.
Figure 5D:
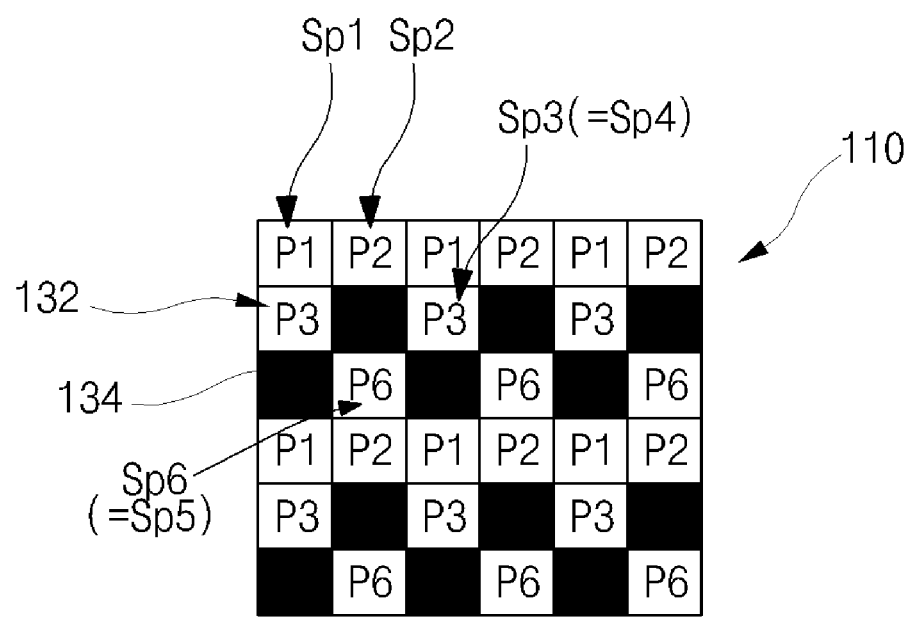

FIGS. 5A and 5B are plane views showing image pixels observed an imaged display device according to an embodiment of the invention at first and second viewing zones with a narrow viewing angle mode, respectively, and FIGS. 5C and 5D are plane views showing image pixels observed an imaged display device according to an embodiment of the invention at first and second viewing zones with a wide viewing angle mode, respectively. As shown in FIGS. 5A and 5C, when a user in the first viewing zone "VZ1" (of FIG. 3) observes the image display device 110, images from the third and sixth image sub-pixels "P3" and "P6" (of FIG. 4A) are not displayed because of the blocking portion in the barrier 130 (of FIG. 4B). Since the images by first, second, fourth and fifth image signal "Sp1", "Sp2", "Sp3" and "Sp4" from the first, second, fourth and fifth image sub-pixels "P1," "P2," "P4," and "P5" pass the transmissive portion 134 in the barrier 130 (of FIG. 4B) and are displayed in the first viewing zone "VZ1" (of FIG. 3). Accordingly, the user in the first viewing zone "VZ1" (of FIG. 3) can observe images from the first, second, fourth and fifth image sub-pixels "P1", "P2," "P4," and "P5". When an image signal producing a desired image is supplied into the first, second, fourth and fifth image sub-pixels "P1", "P2", "P4," and "P5", the user in the first viewing zone "VZ1" (of FIG. 3) observes the desired image.

As shown in FIG. 5B, when the user in the second viewing zone "VZ2" (of FIG. 3) observes the image display device 110, images from the fourth and fifth image sub-pixels "P4" and "P5" (of FIG. 4A) are not displayed because of the blocking portion in the barrier 130 (of FIG. 4B). Since the images from the first, second, third and sixth image sub-pixels "P1", "P2", "P3," and "P6" pass the transmissive portion 134 in the barrier 130 (of FIG. 4B) and are displayed in the second viewing zone "VZ2" (of FIG. 3). Accordingly, the user in the second viewing zone "VZ2" (of FIG. 3) observes images from the first, second, third and sixth image sub-pixels "P1", "P2", "P3," and "P6." Since the image signal producing undesired image is supplied into the third and sixth image sub-pixels "P3" and "P6" with the narrow viewing angle mode, the user in the second viewing zone "VZ2" (of FIG. 3) cannot observe the desired image. Namely, since third and sixth image signal "Sp3" and "SP6", which are respectively different from the fourth and fifth image signal "SP4" and "SP5", are supplied to the third and sixth image sub-pixels "P3" and "P6", the user in the second viewing zone "VZ2" (of FIG. 3) cannot observe the desired image. On the other hand, in FIG. 5D, since the third and sixth image signal "Sp3" and "SP6", which are respectively same as the fourth and fifth image signal "SP4" and "SP5", are supplied to the third and sixth image sub-pixels "P3" and "P6", the user in the second viewing zone "VZ2" (of FIG. 3) can observe the desired image in the wide viewing angle mode. Hence, when an image signal producing a desired image is supplied into the first, second, third and sixth image sub-pixels "P1", "P2", "P3," and "P6", the user in the second viewing zone "VZ2" (of FIG. 3) observes the desired image. The desired image may be falsified to produce the undesired image, and the undesired image may mean an insensible image. In other words, whether or not the user in the second viewing zone "VZ2" (of FIG. 3) observes the desired image may be determined by controlling the image signal supplied into the third and sixth image sub-pixels "P3" and "P6."

As mentioned above, the image display device 110 according to an embodiment of the invention includes the barrier 130 (of FIG. 4B) as the viewing zone producing unit and controls the image signal supplied into the display panel 120 (of FIG. 4A). The image display device 110 has the convertibility between the wide and narrow viewing angle modes. In addition, since the image from four image pixels among the first to sixth image sub-pixels "P1" to "P6" is displayed in the first and second viewing zones "VZ1" and "VZ2" (of FIG. 3), there is no deterioration of luminance and resolution.

Figure 6:
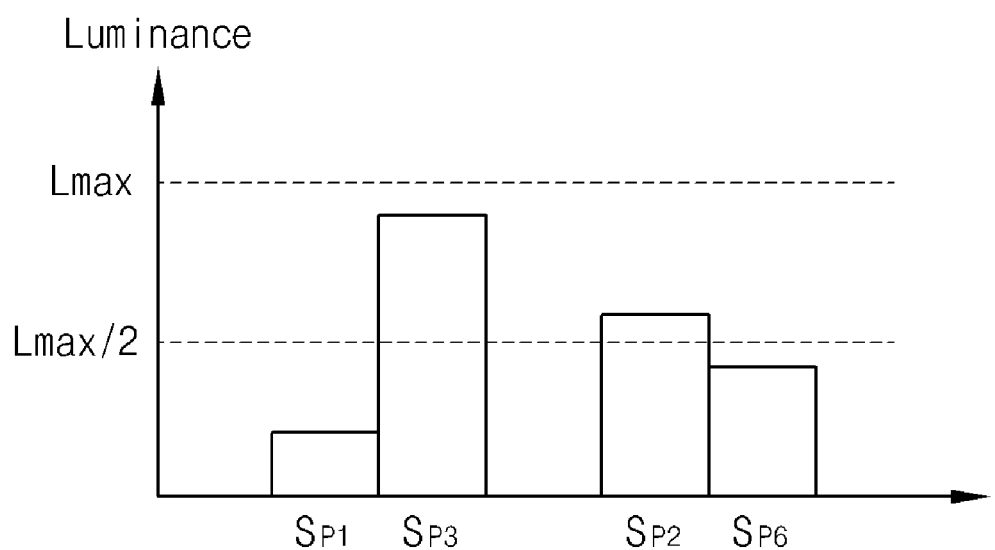
FIG. 6 is a graph showing luminance of an image signal supplied into an image display device according to an embodiment of the invention.

FIG. 6 is a graph showing luminance of an image signal supplied into an image display device according to an embodiment of the invention. Referring to FIGS. 5B and 6, the desired image is supplied into the first, second, fourth and fifth image sub-pixels "P1," "P2," "P4," and "P5" regardless of the viewing angle mode. However, the image supplied into the third and sixth image sub-pixels "P3" and "P6" depend on the viewing angle mode. For example, when the image display device is operated in the wide viewing angle mode, the desired image is supplied into the third and sixth image sub-pixels "P3" and "P6." When the image display device is operated in the narrow viewing angle mode, the undesired image may be supplied into the third and sixth image sub-pixels "P3" and "P6".

As mentioned above, the undesired image may be obtained by falsifying the desired image. For example, a first image signal "$S_{P1}$" is falsified to produce a third image signal "$S_{P3}$." The first and third image signals "$S_{P1}$" and "$S_{P3}$" are supplied into the first and third image sub-pixels "P1" and "P3," respectively. A second image signal "$S_{P2}$" is falsified to produce a sixth image signal "$S_{P6}$." The second and sixth image signals "$S_{P2}$" and "$S_{P6}$" are supplied into the second and sixth image sub-pixel "P2" and "P6," respectively. The first image signal "$S_{P1}$" is falsified so that a summation between luminance of the first image signal "$S_{P1}$" and luminance of the third image signal "$S_{P3}$" has the same value as a half of a maximum luminance "Lmax" of each image pixel. Similarly, the second image signal "$S_{P2}$" is falsified, and a summation between luminance of the second image signal "$S_{P2}$" and luminance of the sixth image signal "$S_{P6}$" has the same value as the half of the maximum luminance "Lmax" of the each image pixel.

As shown in FIG. 5B, the first image sub-pixel "P1" in (3N−2)th rows is adjacent to the third image sub-pixel "P3" in (3N−1)th rows. Also, the second image sub-pixel "P2" in (3N−2)th rows is adjacent to the sixth image sub-pixel "P6" in (3N)th rows. As a result, when the image display device is observed by a user in the second viewing zone "VZ2", each pixel unit "UP" has the same luminance, and the user in the second viewing zone "VZ2" does not observe the desired image. Thus, the image display device is operated in the narrow viewing angle mode.

Although not shown, each image sub-pixel may have a plurality of sub-color image pixels producing different colors. Similarly to the above-mentioned falsification, image signals is falsified and supplied into the plurality of sub-color image pixels.

Figure 7:
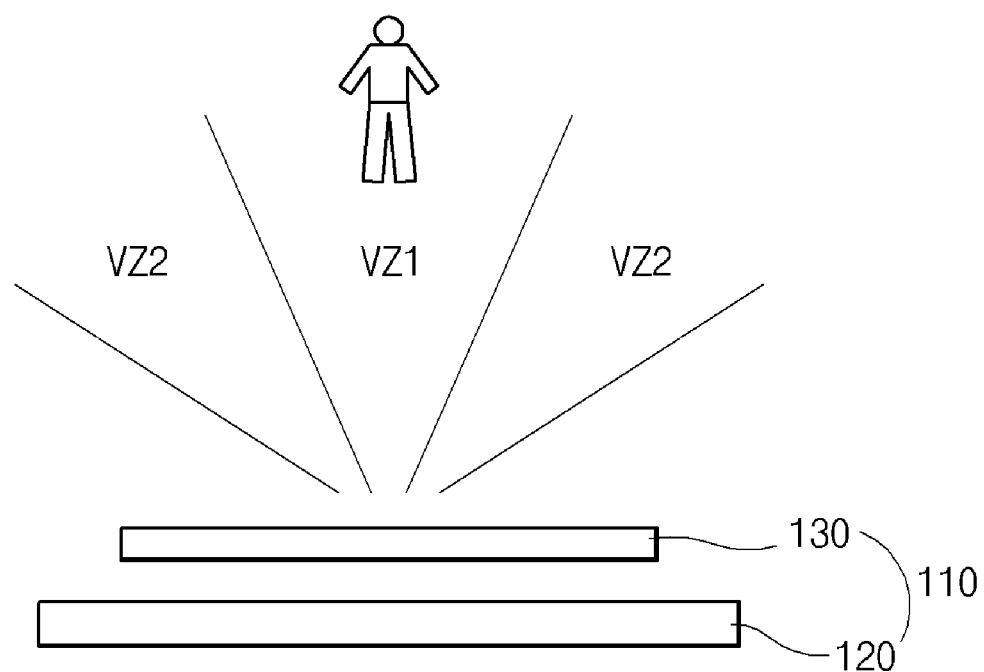
FIG. 7 is a plane view showing an image display device displays an image according to an embodiment of the invention.

FIG. 7 is a plane view showing an image display device displays an image according to an embodiment of the invention. As shown in FIG. 7, the image display device 110 according an embodiment to the invention includes the display panel 120 and the barrier 130. The image display device 110 forms the first and second viewing zones "VZ1" and "VZ2." When the image display device 110 is operated in the wide viewing angle mode, the users in the first and second viewing zones "VZ1" and "VZ2" may observe the desired image from four image pixels among the first and sixth image sub-pixels "P1" to "P6" of the display panel 120 by supplying a same image signal into the third and sixth image sub-pixels "P3" and "P6" as the fourth and fifth image sub-pixels "P4" and "P5." The user in the first viewing zone "VZ1" observes the desired image from the first, second, fourth and fifth image sub-pixels "P1," "P2," "P4," and "P5," and the user in the second viewing zone "VZ2" observes the desired image from the first, second, third and sixth image sub-pixels "P1," "P2," "P3," and "P6."

In addition, when the image display device 110 is operated in the narrow viewing angle mode, the third and sixth image sub-signals "$S_{P3}$" and "$S_{P6}$," which are falsified from the first and second image signals "$S_{P1}$" and "$S_{P2}$," respectively, are supplied into the third and sixth image sub-pixels "P3" and "P6." As a result, the user in the first viewing zone "VZ1" can observe the desired image from the first, second, fourth and fifth image sub-pixels "P1," "P2," "P4," and "P5." However, the user in the second viewing zone "VZ2" cannot observe the desired image. In other words, when the image display panel 110 according to an embodiment of the invention is operated in the narrow viewing angle mode, the user in only the first viewing zone "VZ1" can observe the desired image.

As mentioned above, the blocking portion 134 (of FIG. 3) of the barrier 130 blocks the image from the display panel 120. However, in another exemplary embodiment, the image may pass through the blocking portion 134 (of FIG. 3) in the wide viewing angle mode and may not pass through the blocking portion 134 in the narrow viewing angle mode.

Figure 8:
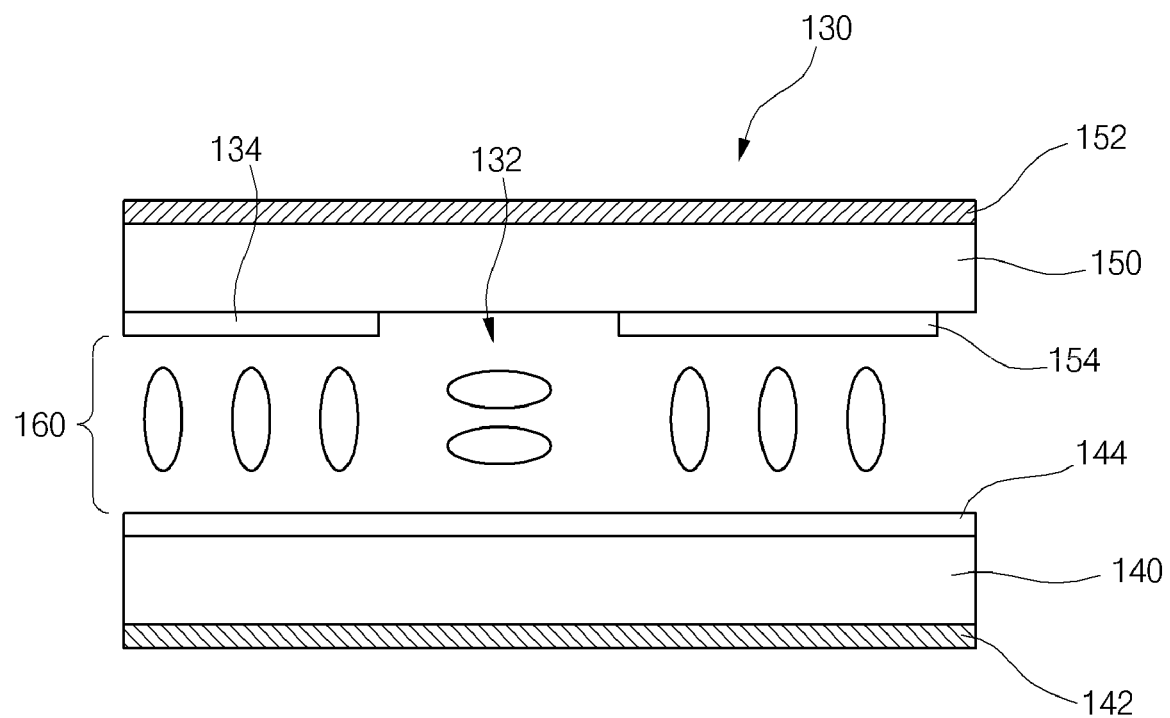
FIG. 8 is a cross-sectional view showing a barrier for an image display device according to an embodiment of the invention.

FIG. 8 is a cross-sectional view showing a barrier for an image display device according to an embodiment of the invention. As shown in FIG. 8, the barrier 130 includes a first substrate 140, a second substrate 150, and a liquid crystal layer 160. The first and second substrates 140 and 150 face each other, and the liquid crystal layer 160 is interposed between the first and second substrates 140 and 150. First and second polarizers 142 and 152 are formed on outer surfaces of the first and second substrates 140 and 150, respectively. In addition, first and second electrodes 144 and 154 are formed on inner surfaces of the first and second substrates 140 and 150, respectively. The first electrode 144 may be formed on the entire surface of the first substrate 140. Further, the second electrode 154 includes the transmissive portion 132 and the blocking portion 134. Voltages are supplied to the first and second electrodes 144 and 154 to induce an electric field between the first and second electrodes 144 and 154. The liquid crystal layer 160 has different degrees of light transmittance depending on the induced electric field. For example, when the same voltage is supplied to the first and second electrodes 144 and 154, the liquid crystal layer 160 provide some transmittance. Moreover, when different voltages are supplied to the first and second electrodes 144 and 154, the liquid crystal layer 160 provides no transmittance. The first and second electrodes 144 and 154 may be made of a transparent conductive material that transmits light.

When the image display device 110 including the above-mentioned barrier 130 is operated in the wide viewing angle mode, the blocking portion 134 transmits an image signal, such that the users in the first viewing zone "VZ1" or the second viewing zone "VZ2" observe the desired image. The desired image may be observed from the first to sixth image sub-pixels "P1" to "P6." The third and sixth image sub-pixel "P3" and "P6" may receive the same image signal as the fourth and fifth image sub-pixels "P4" and "P5," or an image signal may be distributed into the first to sixth image sub-pixels "P1" to "P6." As a result, when the image display device 110 is operated in the wide viewing angle mode, there is no deterioration of luminance and resolution.

Figure 9A:
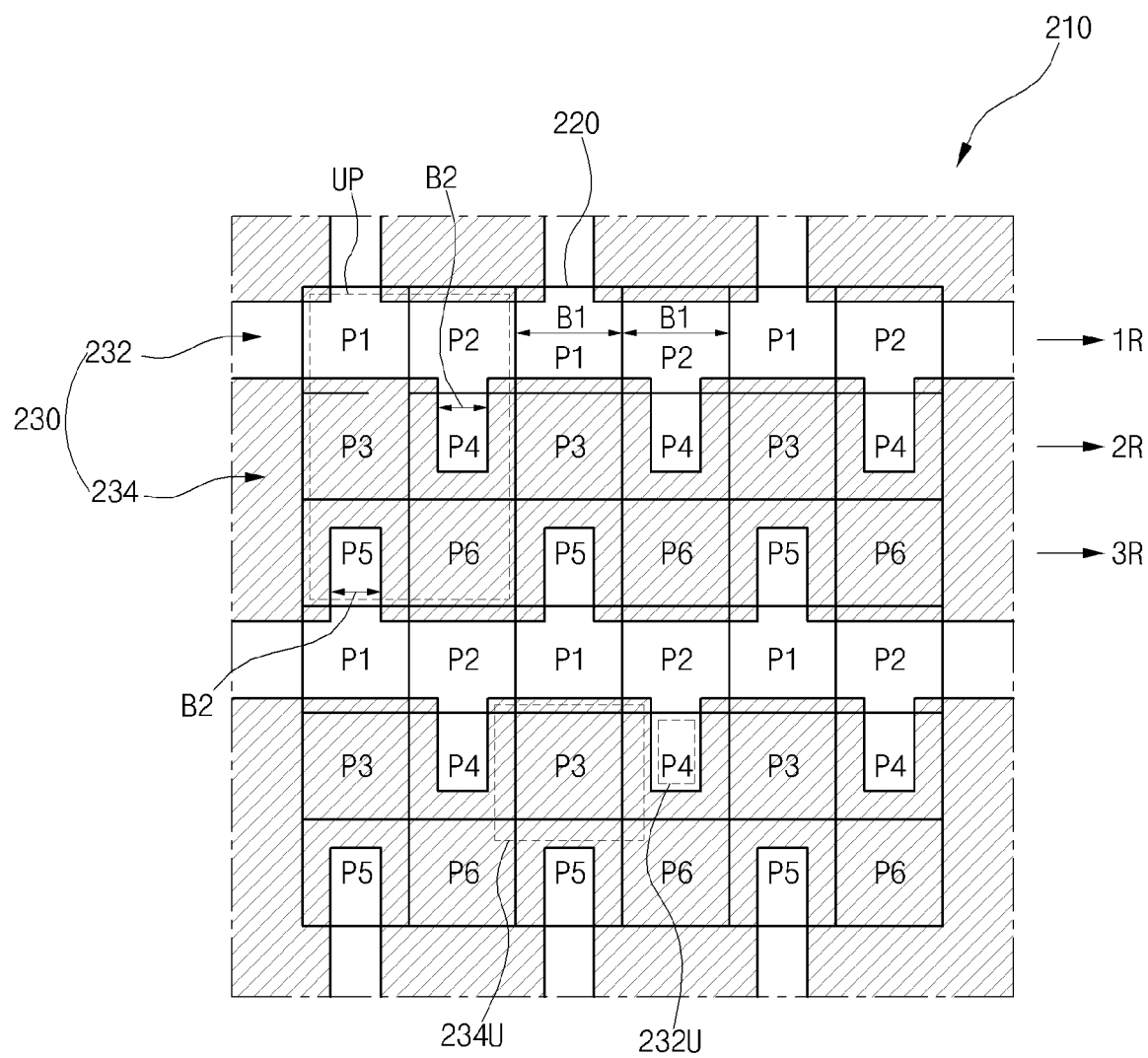
FIGS. 9A and 9b are plane views showing a barrier and sub-pixels of an image display device for different viewing zones, according to embodiments of the invention.
Figure 9B:
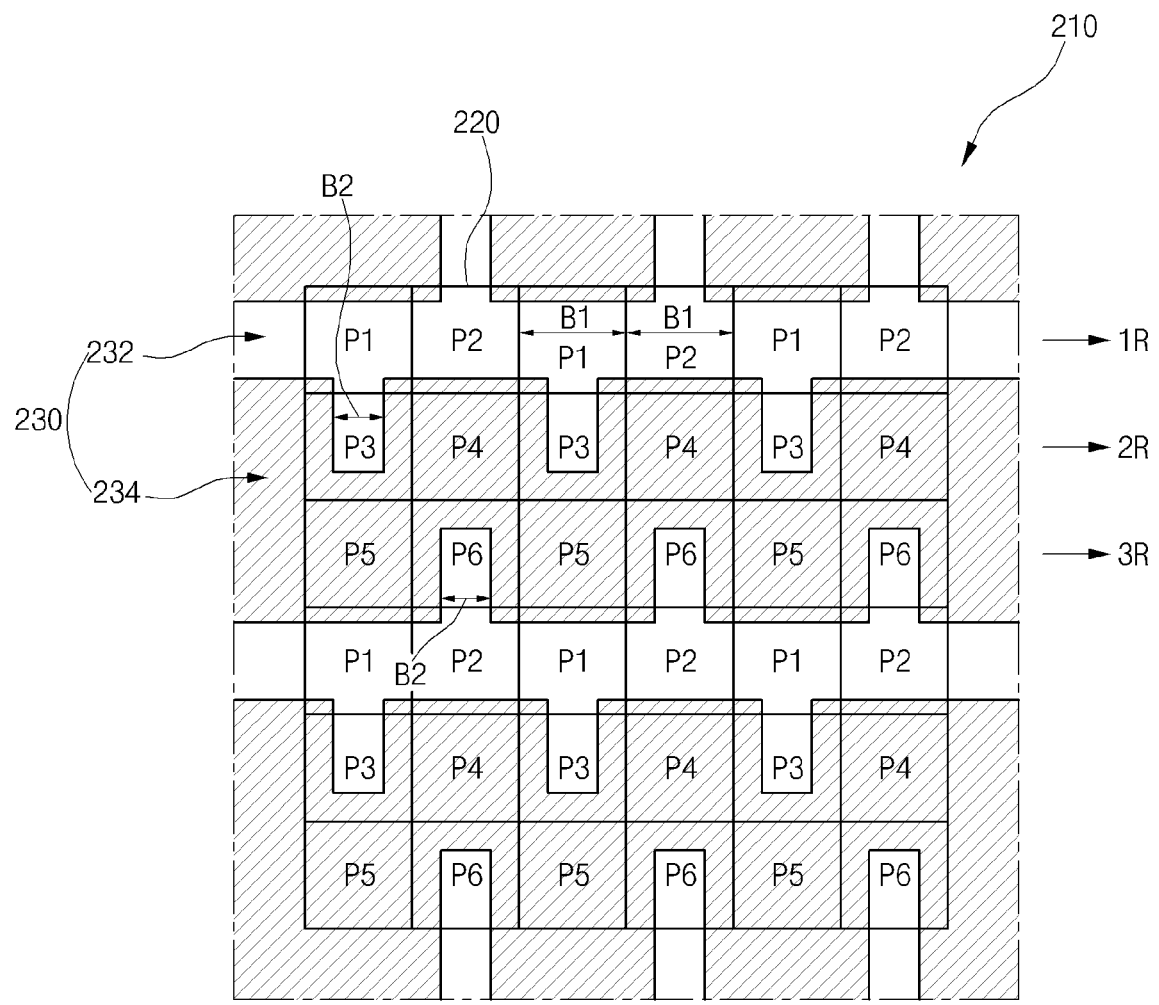

FIGS. 9A and 9b are plane views showing a barrier and sub-pixels of an image display device for different viewing zones, according to embodiments of the invention. As shown in FIGS. 9A and 9B, an image display device 210 includes a display panel 220 having a plurality of pixel units "UP" arranged in a matrix shape. Each of the pixel units "UP" includes the first to sixth image sub-pixels "P1" to "P6." The first to sixth image sub-pixels "P1" to "P6" may also be arranged in a matrix shape. The image display device 210 also includes a barrier 230 having a plurality of transmissive portions 232 and a plurality of blocking portions 234 (shown as hatching regions). The transmissive portions 232 and the blocking portions 234 are alternately arranged in (3N−1)th and (3N)th rows. In addition, only the transmissive portions 232 are arranged in (3N−2)th rows without the blocking portions 234.

A first row "1R" of the image display device 210 only includes the transmissive portions 232. Since the first and second image sub-pixels "P1" and "P2" correspond to the first row "1R," the users in the first and second viewing zones "VZ1" (of FIG. 3) and "VZ2" (of FIG. 3) observe the same image from the first and second image sub-pixels "P1" and "P2". Second and third rows "2R" and "3R" of the image display device 210 include the transmissive portions 232 and the blocking portions 234 arranged alternatively with one another. Since the third and fourth image sub-pixels "P3" and "P4" correspond to the second row "2R," the users in the first and second viewing zones "VZ1" (of FIG. 3) and "VZ2" (of FIG. 3) observe an image from one of the third and fourth sub-pixels "P3" and "P4," respectively. Moreover, since the fifth and sixth image sub-pixels "P5" and "P6" correspond to the third row "3R", the users in the first and second viewing zones "VZ1" (of FIG. 3) and "VZ2" (of FIG. 3) observe an image from one of the fifth and sixth sub-pixels "P5" and "P6," respectively.

The blocking portion 234 includes a plurality of unit blocking portions 234u. The unit blocking portions 234u may partially overlap and are repeatedly arranged with one another. However, if a unit blocking portion 234u has an area the same as or less than that of each of the image sub-pixels "P1" to "P6," the viewing zones become discrete, such that the user in the first and second viewing zones "VZ1" (of FIG. 3) and "VZ2" (of FIG. 3) may observe undesired images. For example, if there is an interference between adjacent image sub-pixels, a cross-talk defect may be generated. Thus, in accordance with an embodiment of the invention, each of the unit blocking portion 234u has an area greater than that of each of the image sub-pixels "P1" to "P6." In addition, when the transmissive portion 232 includes a plurality of unit transmissive portions 232u, each of the unit transmissive portions 232u has an area less than that of each of the image sub-pixel "P3" to "P6" in the second and third rows "2R" and "3R" of the image display device 210.

Moreover, when the image display device 210 has different effective areas between a first image from the first and second sub-pixels "P1" and "P2" and a second image from the third to sixth sub-pixels "P3" to "P6," there may be a problem that a blocking property in side viewing angels is reduced. For example, a user in the first and second viewing zones "VZ1" (of FIG. 3) and "VZ2" (of FIG. 3) may be able to observe all of the first images from the first and second sub-pixels "P1" and "P2". However, a user in the first and second viewing zones "VZ1" (of FIG. 3) and "VZ2" (of FIG. 3) may be able to observe only a part of the second images from the third and sixth sub-pixels "P3" and "P6" and the fourth and fifth sub-pixels "P4" and "P5."

A first width "B1" of the first image is greater than a second width "B2" of the second image. Accordingly, a user in the first viewing zone "VZ1" (of FIG. 3) may observe the first image from the first and second image sub-pixels "P1" and "P2" greater than the second image from the fourth and fifth image sub-pixels "P4" and "P5." Similarly, a user in the second viewing zone "VZ2" (of FIG. 3) may observe the first image from the first and second image sub-pixels "P1" and "P2" greater than the second image from the third and sixth image sub-pixels "P3" and "P6."

Further, each of the image sub-pixel "P1" to "P6" may have different luminance. For example, luminance of the second image from the third and sixth image sub-pixels "P3" and "P6" and the fourth and fifth image sub-pixels "P4" and "P5" may be 60% to 90% of luminance of the first image from the first and second image sub-pixels "P1" and "P2" in the narrow viewing angle mode. In addition, if the first image from the first and second sub-pixels "P1" and "P2" has greater luminance than the second image from the third and sixth sub-pixels "P3" and "P6" in the second viewing zone "VZ2" (of FIG. 3), the user in the second viewing zone "VZ2" (of FIG. 3) may observe the first image. However, the first image preferably is not viewed by the user in the second viewing zone "VZ2" (of FIG. 3) in the narrow viewing angle mode.

Figure 10:
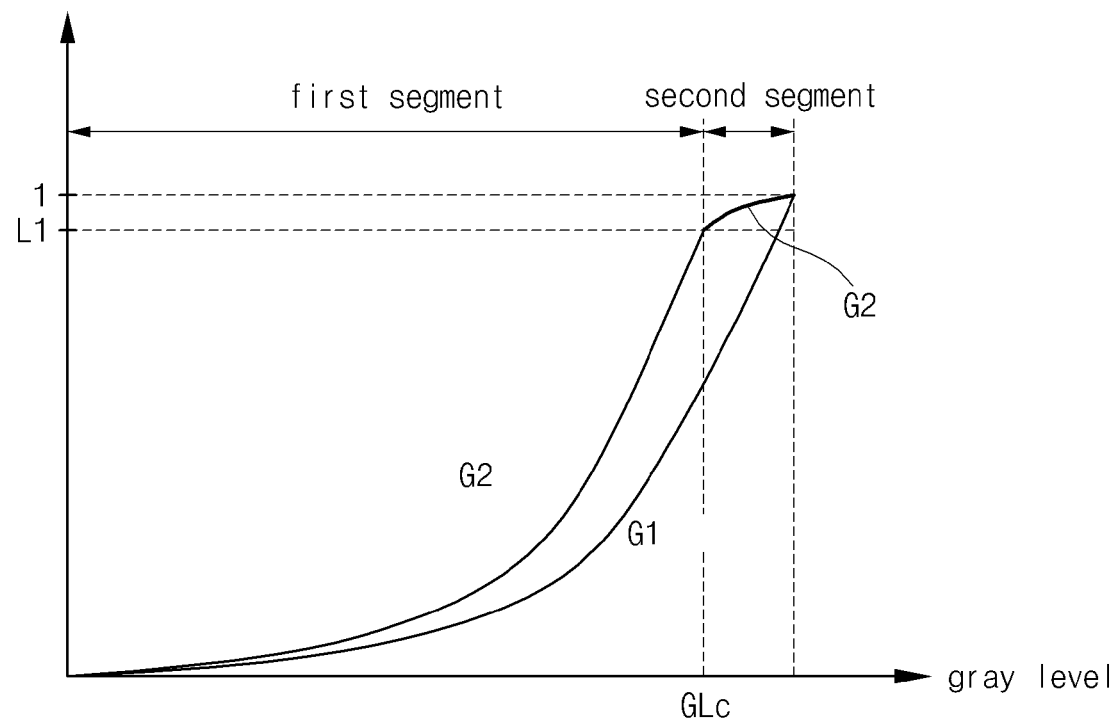
FIG. 10 is a graph of gamma showing signal curves for each pixels of an image display device according to an embodiment of the invention.

To resolve these problems, the image display device according to present invention uses different gamma signal curves, such that each sub-pixel produces different luminance in a same gray level as shown FIG. 10. FIG. 10 is a graph of gamma showing signal curves for each pixels of an image display device according to an embodiment of the invention. According to an embodiment of the invention, an image display device uses at least first and second gamma signals. The first and second gamma signals respectively have curves "G1" and "G2" as shown in FIG. 10. The first gamma signal curve "G1" is used for the first and second image sub-pixels "P1" and "P2", and the second gamma signal curve "G2" is used for the third to sixth image sub-pixels "P3" to "P6". As a result, the luminance is normalized such that normalized luminance has a maximum value of 1.

For example, when the same gray level is applied to the first to sixth image sub-pixels "P1" to "P6", the second image from the fourth and fifth image sub-pixels "P4" and "P5" and the third and sixth image sub-pixels "P3" and "P6" has normalized luminance greater than the first image from the first and second image sub-pixels "P1" and "P2." Particularly, the difference between the first and second images is compensated by the above process, such that the problem of blocking property in side viewing angles is improved. For example, the second gamma signal curve "G2" has the normalized luminance C1/C2 times as much as the first gamma signal curve "G1" in the same gray level until a critical gray level "GLc". When the gray level is divided into first and second segments, the critical gray level "GLc" may be between the first and second segments. "C1" refers to a contribution of the first image in the first and second image sub-pixels "P1" and "P2" to a total image with regard to the luminance, and "C2" refers to a contribution of the second image in the third and sixth image sub-pixels "P3" and "P6" to a total image with regard to the luminance. The values of "C1" and "C2" may be in proportion to the effective areas of the first and second image sub-pixels "P1" and "P2" and the third and sixth image sub-pixels "P3" and "P6".

Since the contribution "C2" has low value in the first segment, the third and sixth image sub-pixels "P3" and "P6" produce images using the second gamma signal curve "G2". In other hands, since the contribution "C1" has high value in the first segment, the first and second image sub-pixels "P1" and "P2" produce images using the first gamma signal curve "G1". As a result, the third and sixth image sub-pixels "P3" and "P6" produce images having normalized luminance greater than the first and second image sub-pixels "P1" and "P2," such that the difference of effective areas between the first and second image sub-pixels "P1" and "P2" and the third and sixth image sub-pixels "P3" and "P6" is compensated.

In other hands, in the second segment, the first and second image sub-pixels produce images using the first gamma signal curve "G1". The fourth and fifth image sub-pixels "P4" and "P5" and the third and sixth image sub-pixels "P3" and "P6" produce images using the second gamma curve "G2". In the second segment, the gray level has a greater value than the critical gray level "GLc". The normalized luminance has a value of "L1" at the critical gray level "GLc". The critical gray level "GLc" and the normalized luminance "L1" corresponding to the critical gray level "GLc" may be determined based on the considered area and luminance differences between sub-pixels.

In FIG. 10, a luminance difference between the first and second gamma signal curve "G1" and "G2" in the second segment is smaller than that in the first segment. However, since the luminance of the second gamma signal curve "G2" is greater than that of the first gamma signal curve "G1", the difference of effective areas between the first and second image sub-pixels "P1" and "P2" and the third and sixth image sub-pixels "P3" and "P6" is compensated. As a result, in the narrow viewing angle mode, the viewing angle restricting effect is improved.

A flat panel display ("FPD") device, such as a liquid crystal display ("LCD") device, a field emission display ("FED") device, a plasma display panel ("PDP"), and an electroluminescent display ("ELD"), may be employed as the display panel in the image display device according to an embodiment of the invention. Although not shown, a display device having a plurality of pixels may be employed as a display panel in the image display device according to an embodiment of the invention. When a transmissive type LCD device including a backlight assembly and a liquid crystal panel is employed for the display panel, the barrier may be between the liquid crystal panel and the user or may be between the backlight assembly and the liquid crystal panel.

Accordingly, an image display device according to an embodiment of the invention includes a viewing zone producing unit between a display panel of the image display device and an user to provide different viewing zones. In addition, different image pixels displays images on the different viewing zones, and users in the different viewing zones receive different images.

It will be apparent to those skilled in the art that various modifications and variations can be made in the image display and the method of driving the same of embodiments of the invention without departing from the spirit or scope of the invention. Thus, it is intended that embodiments of the invention cover the modifications and variations of this invention provided they come within the scope of the appended claims and their equivalents.

What is claimed is:

1. An image display device, comprising:
a display panel; and
a barrier including a plurality of transmissive portions and a plurality of blocking portions on the display panel, wherein the plurality of transmissive portions and the plurality of blocking portions are arranged in a matrix, wherein $3N^{th}$ rows and $(3N-1)^{th}$ rows include the plurality of transmissive portions and the plurality of blocking portions, N being a positive integer, $(3N-2)^{th}$ rows include the plurality of transmissive portions excluding the plurality of blocking portions, and the transmissive and blocking portions are alternately arranged.

2. The device according to claim 1, wherein the transmissive portions in the $3N^{th}$ row align with the blocking portions in the $(3N-1)^{th}$ row.

3. The device according to claim 1, wherein the display panel includes a plurality of image pixel units, wherein each of the plurality of image pixel units includes first to sixth sub-pixels, and each of the plurality of image pixel units includes two columns and three rows.

4. The device according to claim 3, wherein the first and second sub-pixels correspond to a first row of the image pixel unit, the third and fourth sub-pixels correspond to a second row of the image pixel unit, and the fifth and sixth sub-pixels correspond to a third row of the image pixel unit.

5. The device according to claim 4, wherein the barrier provides first and second viewing zones having different viewing angles, the first, second, fourth and fifth sub-pixels display a first image in the first viewing zone, and the first, second, third and sixth sub-pixels display a second image in the second viewing zone.

6. The device according to claim 5, wherein the first viewing zone corresponds to a central region of the display panel, and the second viewing zone corresponds to two side regions of the first viewing zone.

7. The device according to claim 6, wherein an image signal supplied into the third and sixth sub-pixels and an image signal supplied into the fourth and fifth sub-pixels are the same.

8. The device according to claim 6, wherein a first summation between a luminance of an image signal in the first sub-pixel and a luminance of an image signal in third sub-pixel adjacent to the first sub-pixel is same as a second summation between a luminance of an image signal in the second sub-pixel and a luminance of an image signal in the sixth sub-pixel adjacent to the second sub-pixel.

9. The device according to claim 8, wherein the first and second summations has substantially a half of a maximum luminance in each sub-pixel.

10. The device according to claim 3, wherein each blocking portion has a greater area than each image pixel.

11. The device according to claim 1, wherein the barrier includes first and second substrates, first and second polarizers, first and second electrodes and a liquid crystal layer, wherein the first and second substrates face each other, the first and second electrodes are disposed on outer surfaces of the first and second substrates, respectively, the first and second electrodes are disposed on inner surface of the first and second substrates, respectively, the liquid crystal layer is interposed between the first and second substrates, and the second electrode corresponds to one of the transmissive and blocking portions.

12. The device according to claim 1, wherein when the display panel includes a liquid crystal panel and a backlight assembly on a rear side of the liquid crystal panel, the barrier is disposed one of a front side of the liquid crystal panel and between the liquid crystal panel and the backlight assembly.

13. An image display device, comprising:
a display panel; and
a barrier including a first row, a second row and a third row, the first row being substantially transmissive, the second row having a plurality of first transmissive portions and first blocking portions, and the third row having a plurality of second transmissive portions and second blocking portions, the first transmissive portions and the first blocking portions respectively align with the second blocking portions and the second transmissive portions.

14. The device according to claim 13, wherein the first transmissive portions and the first blocking portions are alternatively arranged along the second row, and the second transmissive portions and the second blocking portions are alternatively arranged along the third row.

15. The device according to claim 13, wherein the barrier includes first and second substrates, first and second polarizers, first and second electrodes and a liquid crystal layer.

16. The device according to claim 13, wherein the display panel includes a plurality of image pixel units, wherein each of the plurality of image pixel units includes first to sixth sub-pixels, and each of the plurality of image pixel units includes two columns and three rows.

17. The device according to claim 16, wherein the first and second sub-pixels correspond to a first row of the image pixel unit, the third and fourth sub-pixels correspond to a second row of the image pixel unit, and the fifth and sixth sub-pixels correspond to a third row of the image pixel unit.

18. The device according to claim 16, wherein the barrier provides first and second viewing zones having different viewing angles, the first, second, fourth and fifth sub-pixels display a first image in the first viewing zone, and the first, second, third and sixth sub-pixels display a second image in the second viewing zone.

19. The device according to claim 18, wherein the first viewing zone corresponds to a central region of the display panel, and the second viewing zone corresponds to two side regions of the first viewing zone.

20. A method of driving an image display device including a plurality of image pixel units, which convertibly operates in wide and narrow viewing angle modes, each of a plurality of pixel units has first to sixth sub-pixels are arranged in a matrix of two columns and three rows, comprising:
when operating in the narrow viewing angle mode, supplying first to sixth image signals into the first to sixth sub-pixels, respectively, the third and sixth image signals different from the fourth and fifth image signals; and
when operating in the wide viewing angle mode, supplying the first to sixth image signals into the first to sixth sub-pixels, respectively, the third and sixth image signals being same as the fourth and fifth image signals.

21. The method according to claim 20, wherein the step of supplying the first to sixth image signals includes a step of falsifying the first and second image signals to produce the third and fourth image signals, respectively, wherein a first summation between a luminance of the first and third sub-pixels, which are adjacent to each other, is same as a second summation between a luminance of the second and sixth sub-pixels, which are adjacent to each other.

22. The method according to claim 21, wherein the first and second summations have a half of maximum a luminance in each image pixel.

23. The method according to claim 20, wherein at one gray level, the first and second sub-pixels have a first luminance and the third and fourth sub-pixels have a second luminance, and wherein the second luminance is greater than the first luminance.

24. The method according to claim 23, further comprising:
determining first luminance of the first and second image signals using a first gamma signal curve; and
determining second luminance of the third and fourth image signals using a second gamma signal curve.

25. The method according to claim 24, wherein the second gamma signal curve has luminance C1/C2 times as much as the first gamma signal curve at the gray level, C1 corresponding to a contribution of each the first and second sub-pixel to a total luminance, and C2 corresponding to a contribution of each of the third and sixth sub-pixels to a total luminance.

26. The method according to claim 25, wherein the C1/C2 is proportion to A1/A2, wherein A1 corresponding to an area of each of the first and second sub-pixels that is visible through a barrier over the display panel, and A2 corresponding to an area of each of the third and sixth sub-pixels that is visible through the barrier over the display panel.

* * * * *